US010982624B2

(12) United States Patent
Suciu et al.

(10) Patent No.: US 10,982,624 B2
(45) Date of Patent: Apr. 20, 2021

(54) GAS TURBINE ENGINE FRONT ARCHITECTURE

(71) Applicant: RAYTHEON TECHNOLOGIES CORPORATION, Farmington, CT (US)

(72) Inventors: Gabriel L. Suciu, Glastonbury, CT (US); Brian Merry, Andover, CT (US); Christopher M. Dye, Encinitas, CA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/943,100

(22) Filed: Apr. 2, 2018

(65) Prior Publication Data

US 2018/0230944 A1 Aug. 16, 2018

Related U.S. Application Data

(63) Continuation of application No. 11/846,095, filed on Aug. 28, 2007, now Pat. No. 9,957,918.

(51) Int. Cl.
*F02C 7/20* (2006.01)
*F02K 3/06* (2006.01)
*F02C 7/36* (2006.01)

(52) U.S. Cl.
CPC ............... *F02K 3/06* (2013.01); *F02C 7/20* (2013.01); *F02C 7/36* (2013.01)

(58) Field of Classification Search
CPC ...... F02C 7/20; F01D 25/28; B64D 2027/262
See application file for complete search history.

(56) References Cited

U.S. PATENT DOCUMENTS

| 3,797,561 | A | | 3/1974 | Clark et al. |
| 4,055,041 | A | * | 10/1977 | Adamson ............... B64D 27/18 244/53 A |
| 4,251,987 | A | | 2/1981 | Adamson |
| 4,384,453 | A | | 5/1983 | Tudor et al. |
| 4,722,184 | A | | 2/1988 | Chaplin et al. |

(Continued)

FOREIGN PATENT DOCUMENTS

EP 1921007 * 5/2008

OTHER PUBLICATIONS

Johnson et al. Energy Efficient Engine Project Engineering 1979.*

*Primary Examiner* — Gerald L Sung
(74) *Attorney, Agent, or Firm* — Carlson, Gaskey & Olds, P.C.

(57) ABSTRACT

A turbine engine is disclosed that includes a fan case surrounding a fan rotatable about an axis. A core is supported relative to the fan case by support structure arranged downstream from the fan. The core includes a core housing having an inlet case arranged to receive airflow from the fan. A compressor case is arranged axially adjacent to the inlet case and surrounds a compressor stage having a rotor blade with a blade trailing edge. The support structure includes a support structure leading edge facing the fan and a support structure trailing edge on a side opposite the support structure leading edge. The support structure trailing edge is arranged axially forward of the blade trailing edge. In one example, a forward attachment extends from the support structure to the inlet case.

3 Claims, 4 Drawing Sheets

(56) References Cited

U.S. PATENT DOCUMENTS

| | | |
|---|---|---|
| 4,751,816 A | 6/1988 | Perry |
| 4,916,894 A | 4/1990 | Adamson et al. |
| 5,010,729 A | 4/1991 | Adamson et al. |
| 5,197,856 A * | 3/1993 | Koertge ................ F01D 25/246 415/199.4 |
| 5,466,198 A | 11/1995 | McKibbin et al. |
| 5,472,314 A | 12/1995 | Delonge et al. |
| 6,076,835 A * | 6/2000 | Ress .................... F01D 11/005 277/637 |
| 6,158,210 A | 12/2000 | Orlando |
| 6,183,388 B1 * | 2/2001 | Hawkins .................. F02C 7/36 475/336 |
| 6,325,595 B1 * | 12/2001 | Breeze-Stringfellow .................... F01D 17/10 415/144 |
| 6,895,741 B2 | 5/2005 | Rago et al. |
| 6,964,155 B2 | 11/2005 | McCune et al. |
| 7,021,042 B2 | 4/2006 | Law |
| 7,694,505 B2 | 4/2010 | Schilling |
| 2003/0163983 A1 * | 9/2003 | Seda ........................ F01D 5/03 60/226.1 |
| 2006/0130456 A1 | 6/2006 | Suciu et al. |
| 2007/0022739 A1 | 2/2007 | Norris et al. |
| 2008/0022653 A1 | 1/2008 | Schilling |
| 2008/0098714 A1 * | 5/2008 | Orlando ................... F02C 7/36 60/226.1 |
| 2009/0056343 A1 | 3/2009 | Suciu et al. |

\* cited by examiner

GAS TURBINE ENGINE FRONT ARCHITECTURE

CROSS REFERENCE TO RELATED APPLICATIONS

The present disclosure is a continuation of U.S. patent application Ser. No. 11/846,095, filed Aug. 28, 2007.

BACKGROUND

This disclosure relates to a core housing configuration for gas turbine engine that includes a gear driven fan, for example.

Gas turbine engines for commercial aircraft applications typically include an engine core housed within a core nacelle. In one type of arrangement known as a turbofan engine, the core drives a large fan upstream from the core that provides airflow into the core. A fan case and nacelle surround the fan and at least a portion of the core. A compressor section within the core compresses the air from the fan and delivers it downstream into a combustion section. One type of compressor section includes low and high pressure compressors, each with one or more stages. The compressed air is mixed with fuel and combusted in the combustion section. The products of this combustion are then delivered downstream over turbine rotors, which are rotationally driven to provide power to the engine.

The core housing is typically constructed from multiple cases that support various portions of the core. The inlet case is arranged at the front of the core to receive airflow from the fan. A low pressure compressor case is arranged behind the inlet case, and an intermediate case is arranged between the low pressure compressor case and a high pressure compressor case. Typically, the core is supported by the fan case using flow exit guide vanes that straighten the airflow as it exits a bypass flow path, which is arranged between the fan case and core nacelle. Some turbofan engines include a gear train arranged between the compressor section and the fan that is used to drive the fan at a desired speed. The gear train is typically supported by the inlet case. The gear train adds significant weight to the front of the core, which also must be carried by the flow exit guide vanes.

The flow exit guide vanes typically support the core at an axial location aft of the low pressure compressor stages. In one example, the flow exit guide vanes are axially aligned with the intermediate case. A support wall extends a significant length from the area of the flow exit guide vanes and intermediate case to the front of the inlet case to provide adequate support for the gear train. This arrangement is undesirable because it provides limited access to various engine components and makes service and assembly more difficult and costly. Further, the overall axial length of the fan case is larger than desired, which adds weight and complicates packaging. What is needed is a simplified turbine engine core front architecture that provides desired support for the gear train while decreasing weight and cost.

SUMMARY

A turbine engine is disclosed that includes a fan case surrounding a fan. A core is supported relative to the fan case by support structure, such as flow exit guide vanes, which are arranged downstream from the fan. The core includes a core housing having an inlet case arranged to receive airflow from the fan. A compressor case is arranged axially adjacent to the inlet case and surrounds a compressor stage. In one example, the example turbine engine includes a gear train arranged between the fan and a spool. The gear train is axially aligned and supported by the inlet case. An intermediate case is arranged axially adjacent to the compressor case. The support structure is arranged axially forward of the intermediate case. In one example, the support structure is axially aligned with the compressor case.

These and other features of the disclosure can be best understood from the following specification and drawings, the following of which is a brief description.

DETAILED DESCRIPTION

Figure 1:
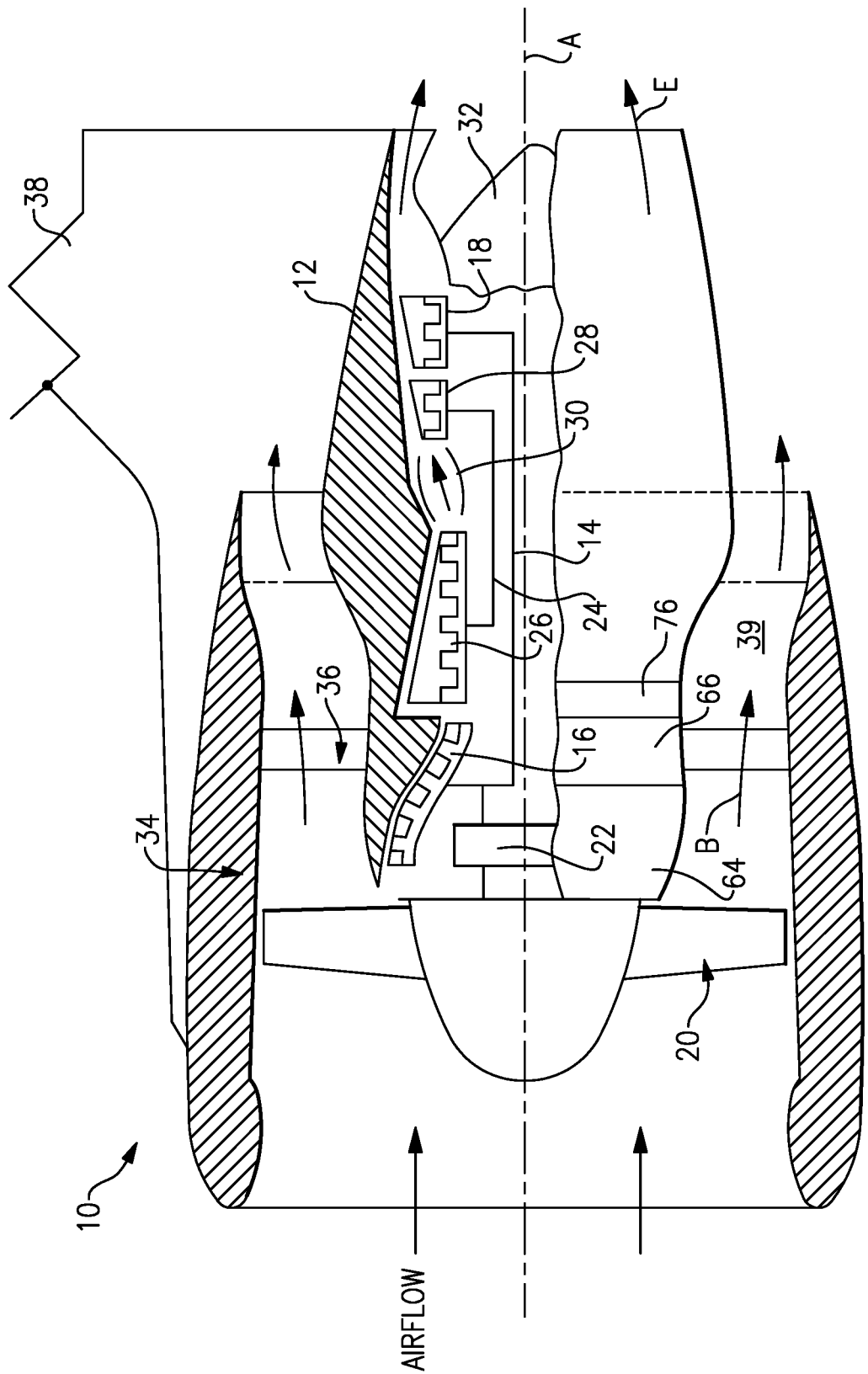
FIG. 1 illustrates a highly schematic cross-sectional view of a geared turbofan gas turbine engine.

A geared turbofan engine 10 is shown in FIG. 1. A pylon 38 secures the engine 10 to an aircraft. The engine 10 includes a core nacelle 12 that surrounds a low spool 14 and high spool 24 rotatable about an axis A. The low spool 14 supports a low pressure compressor 16 and low pressure turbine 18. In the example, the low spool 14 drives a fan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the example shown, the engine 10 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and fan 20. The fan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle 12 and a tail cone 32.

Figure 2:
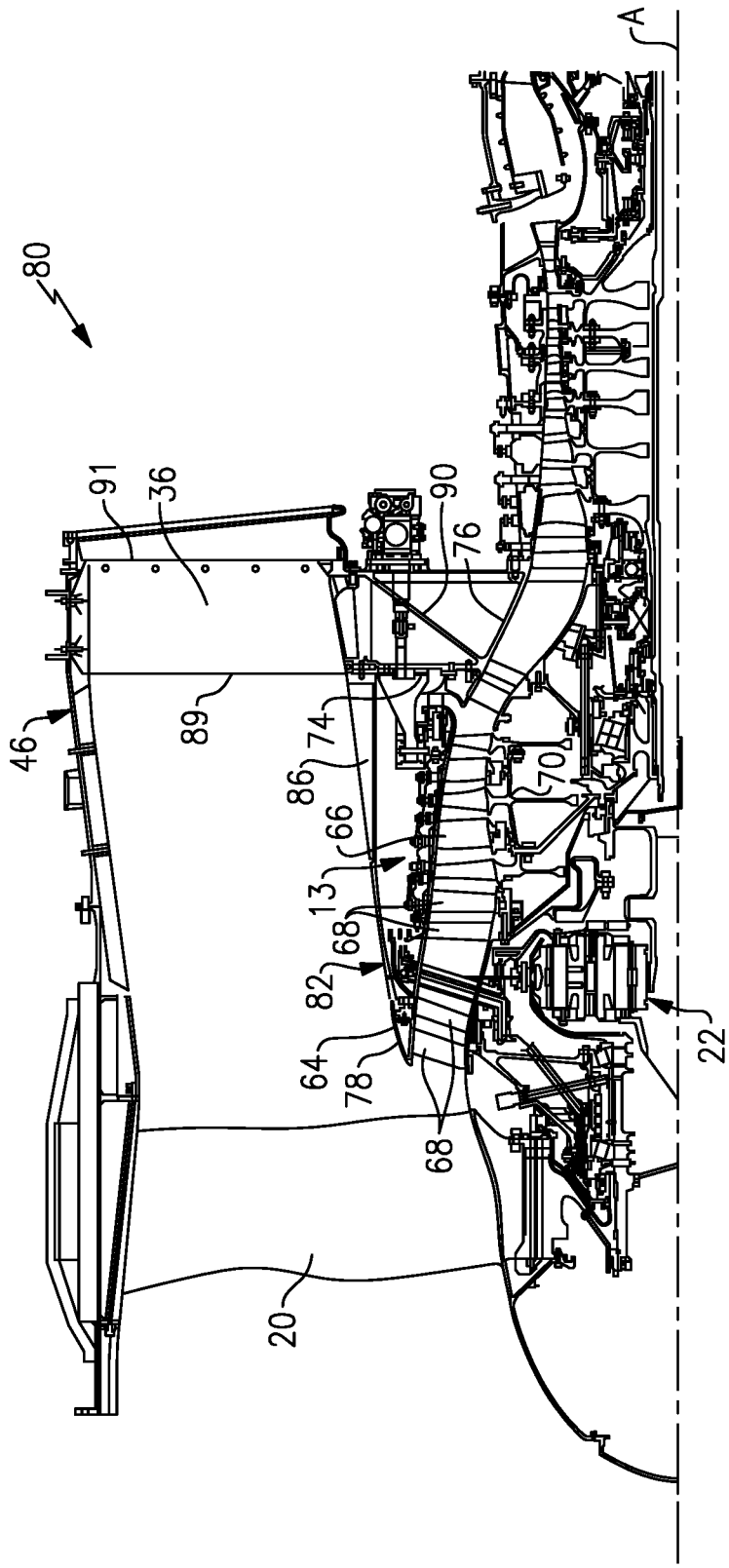
FIG. 2 illustrates a cross-sectional view of a case mounting arrangement illustrating a typical flow exit guide vane configuration relative to the core housing.

Referring to FIG. 2, a core 13 is arranged within the core nacelle 12 and is supported within the fan nacelle 34 by structure 36, such as flow exit guide vanes, extending radially inwardly from a fan case 46. A generally annular bypass flow path 39 is arranged between the core and fan nacelles 12, 34. The examples illustrated in the Figures depict a high bypass flow arrangement in which approximately eighty percent of the airflow entering the fan nacelle 34 bypasses the core nacelle 12. The bypass flow B within the bypass flow path 39 exits the fan nacelle 34 through a fan nozzle exit area at the aft of the fan nacelle 34.

The core 13 generally includes at least an inlet case 64, a low pressure compressor case 66, and an intermediate case 76. The inlet case 64 guides airflow from the fan 20 to the low pressure compressor case 66. As shown in FIG. 2, the low pressure compressor case 66 in an example gas turbine engine 80 supports a plurality of compressor stator vanes 68. A rotor 70 rotates about the axis A, and, with the compressor stator vanes 68, help compress air moving through the low pressure compressor case 66.

The guide vanes 36 are axially aligned with the intermediate case 76. The guide vanes 36 secure the intermediate case 76 to the fan case 46. The guide vanes 36 each include at least a rearward attachment 74 and a forward attachment 78, which are arranged on a forward side 89 of the guide vanes 36. The rearward attachment 74 connects to the intermediate case 76 while the forward attachment 78 connects to the inlet case 64. The rearward attachment 74 extends generally perpendicularly to the axis A. An aft attachment 90 extends from an aft side 91 of the guide vanes 36 and intersects with the rearward attachment 74 at the front of the intermediate case 76.

The forward attachment 78 extends a significant distance forward to the inlet case 64, which is generally undesirable. For example, a plumbing connection area 82 is difficult to access and the axial length of the fan case 46 is longer than desired. The lower pressure compressor case 66 is supported through the intermediate case 76 and the inlet case 64 in the arrangement shown in FIG. 2.

Figure 3:
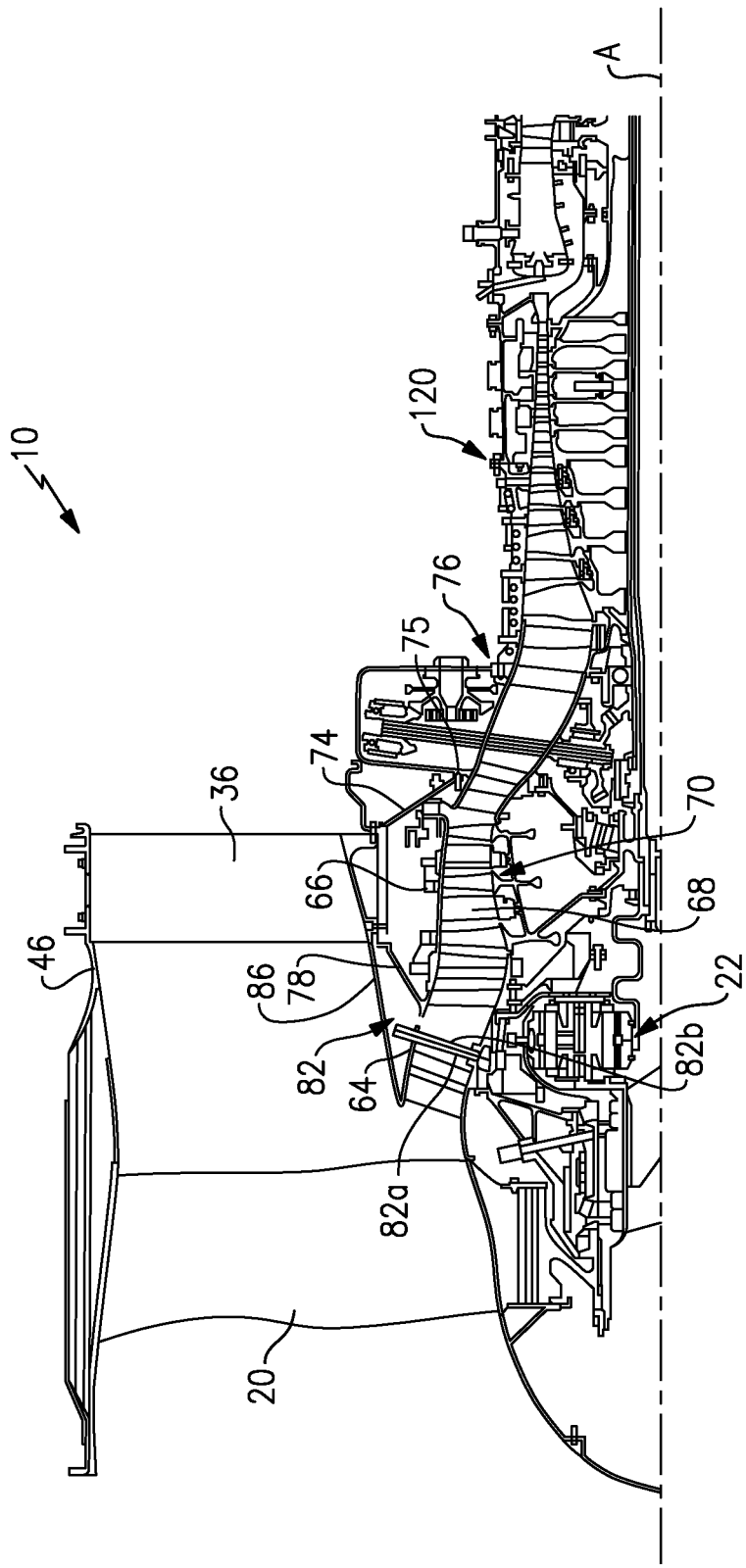
FIG. 3 illustrates a cross-sectional view of an example case mounting arrangement according to the disclosure.

Returning now to an example of the disclosed arrangement shown in FIG. 3, the forward attachment 78 attaches to a front portion of the low pressure compressor case 66. In this example, the forward attachment 78 extends from the guide vanes 36 to support the low pressure compressor case 66. Together, the forward attachment 78 and guide vanes 36 act as a support member for the low pressure compressor case 66. The plumbing connection area 82 is positioned upstream of the forward attachment 78 facilitating access to the plumbing connection area 82. In this example, an operator may directly access the plumbing connection area 82 after removing the fan stream splitter 86. The plumbing connection area 82 typically provides access to a lubrication system 82a, a compressed air system 82b, or both. The lubrication system 82a and compressed air system 82b are typically in fluid communication with the gear train 22.

Maintenance and repair of the gear train 22 may require removing the gear train 22 from the engine 10. Positioning the plumbing connection area 82 ahead of the forward attachment 78 simplifies maintenance and removal of the gear train 22 from other portions of the engine 10. Draining oil from the gear train 22 prior to removal may take place through the plumbing connection area 82 for example. The plumbing connection area 82 is typically removed with the gear train 22. Thus, the arrangement may permit removing the gear train 22 on wing or removing the inlet case 64 from the gas turbine engine 10 separately from the low pressure compressor case 66. This reduces the amount of time needed to prepare an engine for continued revenue service, saving an operator both time and money.

Connecting the forward attachment 78 to the low pressure compressor case 66 helps maintain the position of the rotor 70 relative to the interior of the low pressure compressor case 66 during fan rotation. In this example, the intermediate case 76 supports a rear portion of the low pressure compressor case 66 near a compressed air bleed valve 75.

Figure 4:
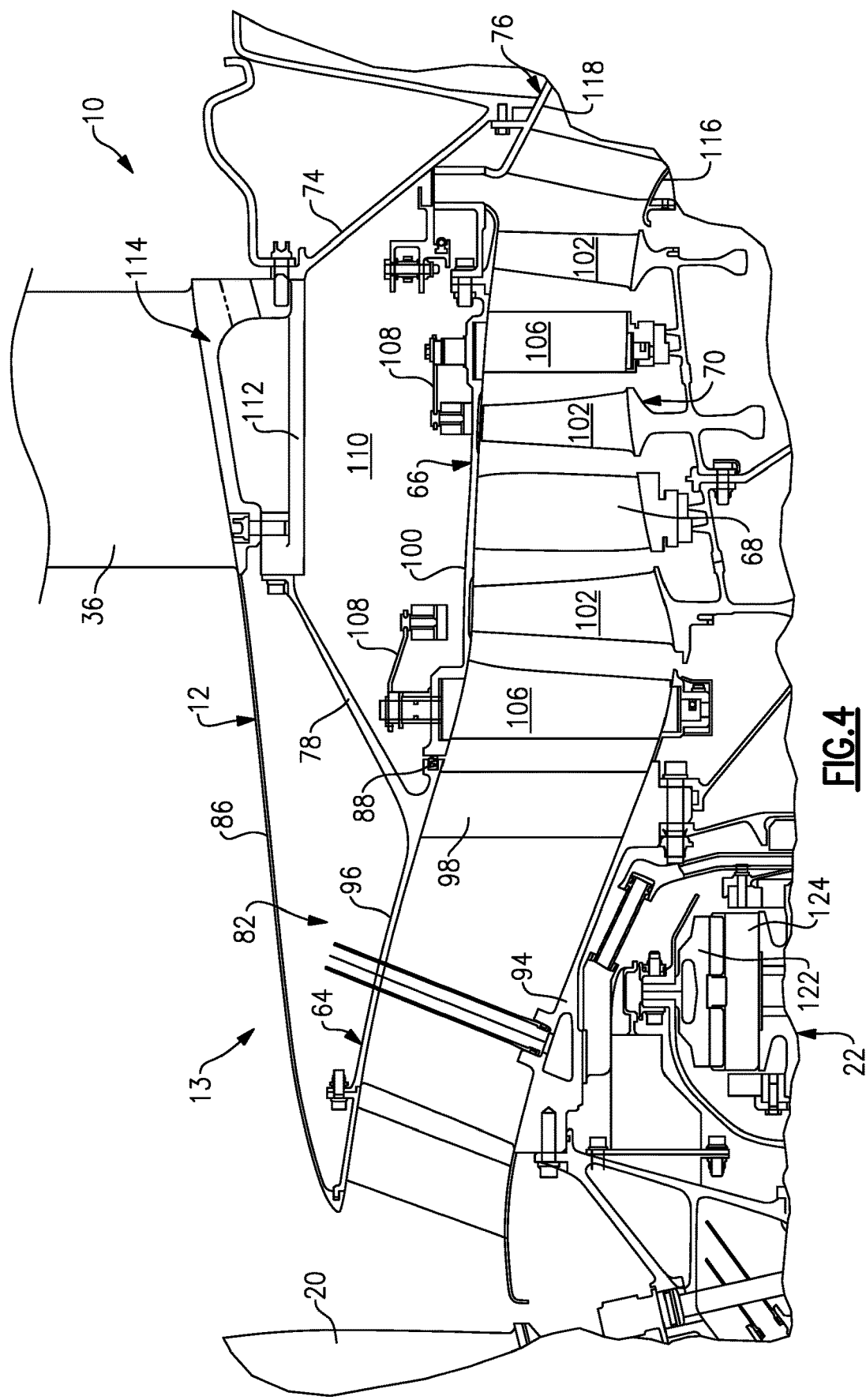
FIG. 4 illustrates an enlarged cross-sectional view of the arrangement shown in FIG. 3 at an intersection between an inlet case and a low pressure compressor case.

As shown in FIG. 4, a seal 88, such as a "W" seal, may restrict fluid movement between the inlet case 64 and the low pressure compressor case 66. In this example, the seal 88 forms the general boundary between the inlet case 64 and the low pressure compressor case 66, while still allowing some amount movement between the cases.

The core 13 is provided by a housing having cases secured to one another in series to house the compressor and turbine sections and support various components. The inlet case 64 includes an outer diameter wall 96 arranged about an inner diameter wall 94. A fixed stator vane 98 extends radially between and joins the inner and outer diameters walls 94, 96, in the example shown.

The low pressure compressor case 66 is arranged axially adjacent to the inlet case 64. The low pressure compressor case 66 includes an outer diameter wall 100 that supports variable stator vanes 106 that are actuated by levers 108. In one example, the low pressure compressor section includes three stages provided by three sets of blades 102 supported on the rotor 70.

The intermediate case 76 includes an inner diameter wall 116 arranged within an outer diameter wall 118. The intermediate case 76 is arranged axially between the low pressure compressor case 66 and a high pressure compressor case 120, which is best shown in FIG. 3. The high pressure compressor case 120 houses the high pressure compressor section.

With continuing reference to FIG. 4, the inlet case 64 includes a forward attachment 78, which extends radially outward and rearward to the guide vanes 36. The rearward attachment 74 extends radially outward and forward from the intermediate case 76 to the guide vanes 36. In the example shown, the forward and rearward attachments 78, 74 are generally equidistant from the guide vanes 36 to the low pressure compressor case 66. The forward and rearward attachments 78, 74 are integral with the inlet and intermediate cases 64, 76 to provide a unitary structure. The forward and rearward attachments 78, 74 are secured to an end 114 of the guide vanes 36 by a portion 112, which is secured to the end 114. A cavity 110 is provided by the forward and rearward attachments 78, 74 and the guide vanes 36, which is arranged outside of the outer diameter wall 100 to enclose the levers 108. In the example shown, the guide vanes 36 are arranged at a generally intermediate axial position relative to the low pressure compressor case 66. The forward and rearward attachments 78, 74 are in an overlapping position axially relative to the low pressure compressor case 66, placing the gear train 22 in closer proximity to the guide vanes 36.

The gear train 22 is axially aligned with the inlet case 64 in the example shown. The gear train 22 includes a ring gear 122 and intermediate gears 124, which are constrained relative to the inlet case 64. Arranging the guide vanes 36 forward of the intermediate case 76 better supports the weight and load distribution attributable to the gear train 22 while providing a more compact fan case 46.

Although an example embodiment has been disclosed, a worker of ordinary skill in this art would recognize that certain modifications would come within the scope of the claims. For that reason, the following claims should be studied to determine their true scope and content.

What is claimed is:
1. A turbine engine comprising:
   a fan case surrounding a fan rotatable about an axis;
   a core supported relative to the fan case by a support structure and arranged downstream from the fan, the core including a core housing having an inlet case arranged to receive airflow from the fan, a compressor case axially adjacent to the inlet case and surrounding a compressor stage having a rotor blade with a blade trailing edge, wherein an intermediate case is arranged between the compressor case and a high pressure compressor case; and wherein the support structure includes a support structure leading edge facing the fan and a support structure trailing edge on a side opposite the support structure leading edge, and the support structure trailing edge arranged axially forward of the blade trailing edge, wherein a forward attachment extends from the support structure to the inlet case, wherein the forward attachment extends radially outward and rearward from the inlet case, wherein the intermediate case supports a rear portion of the compressor case near a compressed air bleed valve, and comprising a rearward attachment extending from the support structure to the intermediate case, wherein the front and rearward attachments are generally equidistant from the support structure to their respective forward and rearward attachment.

2. The turbine engine according to claim 1, comprising variable stator vanes arranged within the compressor case and including actuating levers connected thereto that are arranged within a cavity provided by the front and rearward attachments.

3. The turbine engine according to claim 2, wherein the front and rearward attachments are generally equidistant from the support structure to their respective forward and rearward attachment in the axial direction.

* * * * *